United States Patent [19]

Svatek

[11] 4,200,392
[45] Apr. 29, 1980

[54] PHOTOGRAPHIC COPY APPARATUS WITH CROPPING FEATURE

[75] Inventor: Thomas A. Svatek, Carlisle, Mass.

[73] Assignee: Polaroid Corporation, Cambridge, Mass.

[21] Appl. No.: 13

[22] Filed: Jan. 2, 1979

[51] Int. Cl.² ............................................. G03B 13/28
[52] U.S. Cl. ...................................... 355/45; 355/43; 355/75
[58] Field of Search .................... 355/45, 40, 43, 75, 355/27, 39

[56] References Cited

U.S. PATENT DOCUMENTS

| | | | |
|---|---|---|---|
| 2,866,380 | 12/1958 | Bing | 355/21 |
| 3,065,667 | 11/1962 | Edgerton | 355/27 |
| 3,576,365 | 4/1971 | Callum | 355/43 |
| 3,653,760 | 4/1972 | Johnson | 355/39 |
| 3,697,175 | 10/1972 | Sullivan | 355/39 |
| 3,802,773 | 4/1974 | Schneider | 355/43 |
| 3,848,996 | 11/1974 | Goding | 355/43 |
| 3,988,063 | 10/1976 | McNair et al. | 355/40 |
| 4,059,355 | 11/1977 | Fritsch | 355/43 |
| 4,082,446 | 4/1978 | Driscoll et al. | 355/27 |

Primary Examiner—Richard A. Wintercorn
Attorney, Agent, or Firm—John S. Vale

[57] ABSTRACT

An improved photographic copy apparatus, usable with an original photographic picture to be copied and a photosensitive image recording material having different normalized image area formats thereby requiring cropping of the projected image of the original, for previewing the original picture, selecting a desired portion thereof to be copied that is compatible with the format of the recording material on a normalized basis, and projecting an image of the selected portion onto the recording material for exposure. The apparatus includes a viewing station having a selecting frame thereat. A viewing station picture holder is mounted for movement over the frame, framing the selected portion. By means of a connector, the viewing picture holder is coupled to a projection picture holder that is automatically moved transversely with respect to the lens axis in response to the framing procedure to automatically set it to a corresponding projection position whereat the optical system will project the same selected portion after the picture is transferred from the viewing picture holder to the projection picture holder.

6 Claims, 5 Drawing Figures

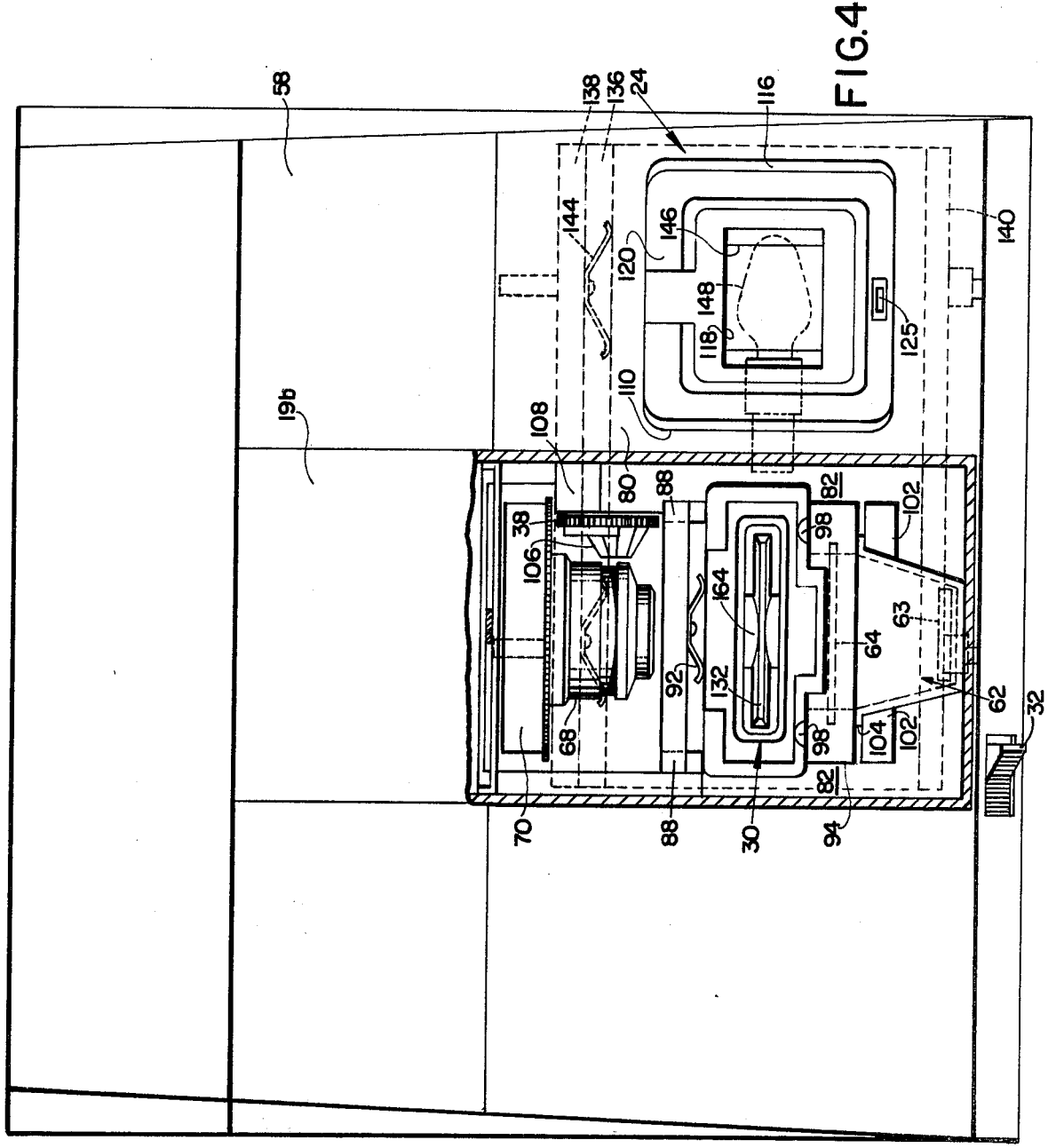

PHOTOGRAPHIC COPY APPARATUS WITH CROPPING FEATURE

BACKGROUND OF THE INVENTION

1. Field of the Invention

The present invention relates to the field of photography and, more specifically, to an improved photographic copy apparatus for previewing an original picture to be copied and projecting an image of the original picture onto a photosensitive recording material for exposure.

2. Description of the Prior Art

Over the years, photographic cameras designed for the mass amateur market, the photographic film used therein and print papers used by photofinishers to make enlarged copies from original pictures (whether they be negative images or positive transparent images) have evolved in a series of well known standardized formats. From the table below, it will be seen that, for the most part, these amateur products have a normalized image area format or normalized ratio of height to width in the range of $1 \times 1$ to $1 \times 1.4$. Professional photographers and serious amateurs have, over the past few years, been more inclined to use 35 mm camera equipment for making both reflection prints and slide transparencies. 35 mm film has a standardized image area format of $24 \times 36$ mm. Normalized, it has a height-to-width ratio of $1 \times 1.5$. When a 35 mm image is printed on a standard size print paper, such as $3.5 \times 5$ inches (normalized to $1 \times 1.43$), it becomes obvious that the projected image must be cropped in the width dimension to fit onto a standard paper. Because photofinishers use automated production lines that are set up for such standard size print paper, the cropping operation often occurs automatically with the image being centered so that the lost image area portions are at the lateral margins. Alternatively, rather than cropping, the photofinisher may choose to project the full frame image onto a standard size print paper so that the full width dimension fits thereon. In this case, however, the finished print will have abnormally wide lateral margins.

A great many users of 35 mm equipment are unaware of the cropping operation and therefore do not provide specific cropping instructions to the photofinisher. In most instances, special cropping instructions will require a hand-printing operation at a premium price.

Some photofinishers do offer to print 35 mm pictures on specialized or non-standard size print paper for providing a full frame image. Examples of this format include print paper of $3.5 \times 5.25$ inches and $8 \times 12$ inches. However, there is generally an extra charge unless a particular photofinisher is set up to print a large volume of full frame 35 mm pictures.

|  | Image Area Dimensions (H × W) | Normalized Format (H × W) |
|---|---|---|
| 35mm Format | 24 × 36 (mm) | 1 × 1.5 |
| Standard Film and Print Paper | 2.5 × 3.5 (inches) | 1 × 1.4 |
|  | 3.5 × 4.5 | 1 × 1.29 |
|  | 3.5 × 5 | 1 × 1.43 |
|  | 4 × 5 | 1 × 1.25 |
|  | 5 × 7 | 1 × 1.4 |
|  | 8 × 10 | 1 × 1.25 |
|  | 11 × 14 | 1 × 1.27 |
|  | 16 × 20 | 1 × 1.25 |
| Self-Developing Film Units | 3 × 3.125 (inches) | 1 × 1.04 |
|  | 2.7 × 3.6 | 1 × 1.33 |
|  | 3.25 × 3.25 | 1 × 1 |
|  | 3.25 × 4.25 | 1 × 1.31 |
|  | 4 × 5 | 1 × 1.25 |
|  | 8 × 10 | 1 × 1.25 |
| Non-Standard Film and Print Paper For Full 35mm Prints | 3.5 × 5.25 | 1 × 1.5 |
|  | 8 × 12 | 1 × 1.5 |

It will be noted, that the list includes self-developing film units which may be used in copy apparatus that allow the user to make copies from original pictures, such as 35 mm slide transparencies, at home.

Again, it will be noted that the normalized format of commercially available self-developing film units fall into the $1 \times 1$ to $1 \times 1.3$ range and therefore is not compatible on a direct enlargement basis with the 35 mm format which is normalized at $1 \times 1.5$.

It is well known in the prior art to provide a photographic copy apparatus for making copies of original pictures. More particularly, there are numerous apparatus disclosed which are especially well suited for making reflection prints from 35 mm slide transparencies.

For example, U.S. Pat. No. 3,065,667 issued to Edgerton on Nov. 27, 1962 provides a slide copier incorporating a self-developing camera therein. The copier includes a previewing station 5 where the user observes and orients the slide which is thereafter put into a slot 7 for a density reading to set the light intensity of a strobe unit. From slot 7 the slide is transferred to a projection tray 9 where it is aligned with a projection lens and illumination system. No mention is made of the incompatibility of the 35 mm format with the instant film used in the copy apparatus. Therefore, if standardized film having a normalized format that falls outside the range of the 35 mm format is used, then the system automatically provides cropping by projecting only that portion of the slide that is compatible with the film format. For a full frame image a specialized non-commercially available film would have to be used.

U.S. Pat. No. 4,082,446 issued to J. J. Driscoll et al. on Apr. 4, 1978 is directed to a combination slide viewer/copier. In the viewing mode, an image of the transparency is projected onto a rear viewing screen. Upon pressing a button, the apparatus converts into a copy mode where the projected image is focused onto a self-developing film unit located at an apparatus exposure plane. Again, the patent is silent as to the incompatibility of the 35 mm format versus the film format and it may assume that the cropping takes place in the projection system and is centered. There is no provision for selective cropping by the operator.

U.S. Pat. No. 3,697,175 issued to Sullivan on Oct. 10, 1972; U.S. Pat. No. 3,653,760 issued to Bruce K. Johnson on Apr. 4, 1972; U.S. Pat. No. 2,866,380 issued to Herbert Bing on Dec. 30, 1958; and commonly assigned copending Application Ser. No. 914,219 filed on June 9, 1978 (now abandoned and replaced by U.S. Ser. No. 060,491 filed on July 25, 1979) all relate to self-developing copy apparatus. Again, these disclosures are silent as to the compatibility of format and it must be assumed that only a preselected portion of the full frame 35 mm image is projected by the optical system.

The last mentioned patent does include a frame adjustment member for locating a predetermined portion of the original picture in optical alignment with the lens axis for varying picture sizes. However, adjustment of the frame is meant to be made only on an occasional basis in that it is secured with adjusting screws 158 which would require the operator to loosen the screws, move the mounting frame and then tighten them again for each photograph of a different format.

Therefore, it is an object of the present invention to provide a simply constructed and compact photographic copy apparatus for use with an original picture and photosensitive copy material that differ in image area formats on a normalized basis and includes a previewing station, means for the operator to simply and accurately select that portion of the original that is compatible on a normalized basis with the copy film format and automatically adjust the position of a projection picture holder with respect to the copy apparatus projection system so that portion of the full frame image of the original picture that is projected corresponds to the selected portion at the viewing station after the original picture is transferred from the viewing station to a projection station.

Other objects of the invention will, in part, be obvious and will, in part, appear hereinafter.

SUMMARY OF THE INVENTION

The present invention provides an improved photographic copy apparatus, usable with an original picture to be copied and photosensitive image recording material that each have respective different first and second normalized image area formats, for previewing the original picture and selecting a portion thereof that is proportional to the format of the copy material and thereafter for projecting an image of the selected portion onto the recording material for exposure. The copy apparatus is of the type including means for locating an image recording material in position for exposure; projection means, including a lens having an optic axis, for projecting an image of the selected portion of the original picture onto the image recording material at the exposure position; means for controlling exposure; a first picture holder for supporting the original picture in optical alignment with the lens axis; and a previewing station, including a second picture holder, for supporting an original picture for viewing and selection of a predetermined portion thereof that is to be copied. The improvement comprises means for mounting the first picture holder for movement transversely relative to the lens axis so that the first picture holder may be located at a selected projection position wherein the selected portion of an original picture supported therein is in optical alignment with the lens axis for image projection onto recording material at the exposure position. Also included are means, cooperatively associated with the previewing station and the second picture holder thereat, for defining a portion selecting frame having a normalized format corresponding to that of the recording material and being proportioned in scale to the format of the original picture so that when an original picture supported in the second holder and the selected frame are in optical superposition, the user may visually determine that portion of the picture within the bounds of the selection frame that will be projected by the lens. One of the selecting frame and picture holder at the viewing station is mounted for movement relative to the other which is fixed. This is done so that the viewing frame may be located with respect to any selected portion of the entire image area of the original picture supported in the picture holder at the previewing station. The final element in the improvement includes means for coupling the movable one of the selecting frame and picture holder at the previewing station to the first or projection picture holder so that it is automatically moved to a corresponding selected projection position wherein it will locate for image projection, the same selected portion of the original picture bounded by the selecting frame after the original picture is transferred from the picture holder at the viewing station to the projection picture holder.

In a preferred embodiment, the selecting frame is fixed at the previewing station and the first and second picture holders are coupled together for coordinated simultaneous movement with one another as the picture in the second picture holder is moved over the selecting frame.

The apparatus disclosed herein is particularly well suited for making 8"×10" copies of 35 mm transparency slides and making the appropriate cropping for this procedure. However, the apparatus may be suitably modified as explained later for use with making copies of reflection prints and/or may be used for other original picture and film or print paper formats.

Other features of the invention relate to the specific structural components used and their location relative to one another to simplify construction, enhance compactness of the apparatus, and facilitate its use by the operator.

BRIEF DESCRIPTION OF THE DRAWINGS

For a fuller understanding of the nature and objects of the present invention, reference should be made to the following detailed description taken in connection with the accompanying drawings wherein:

FIG. 4 is a plan view, partly in section, of the viewing station and image projection station showing the structural relationship of certain selected components.

DESCRIPTION OF THE PREFERRED EMBODIMENT

Figure 1:
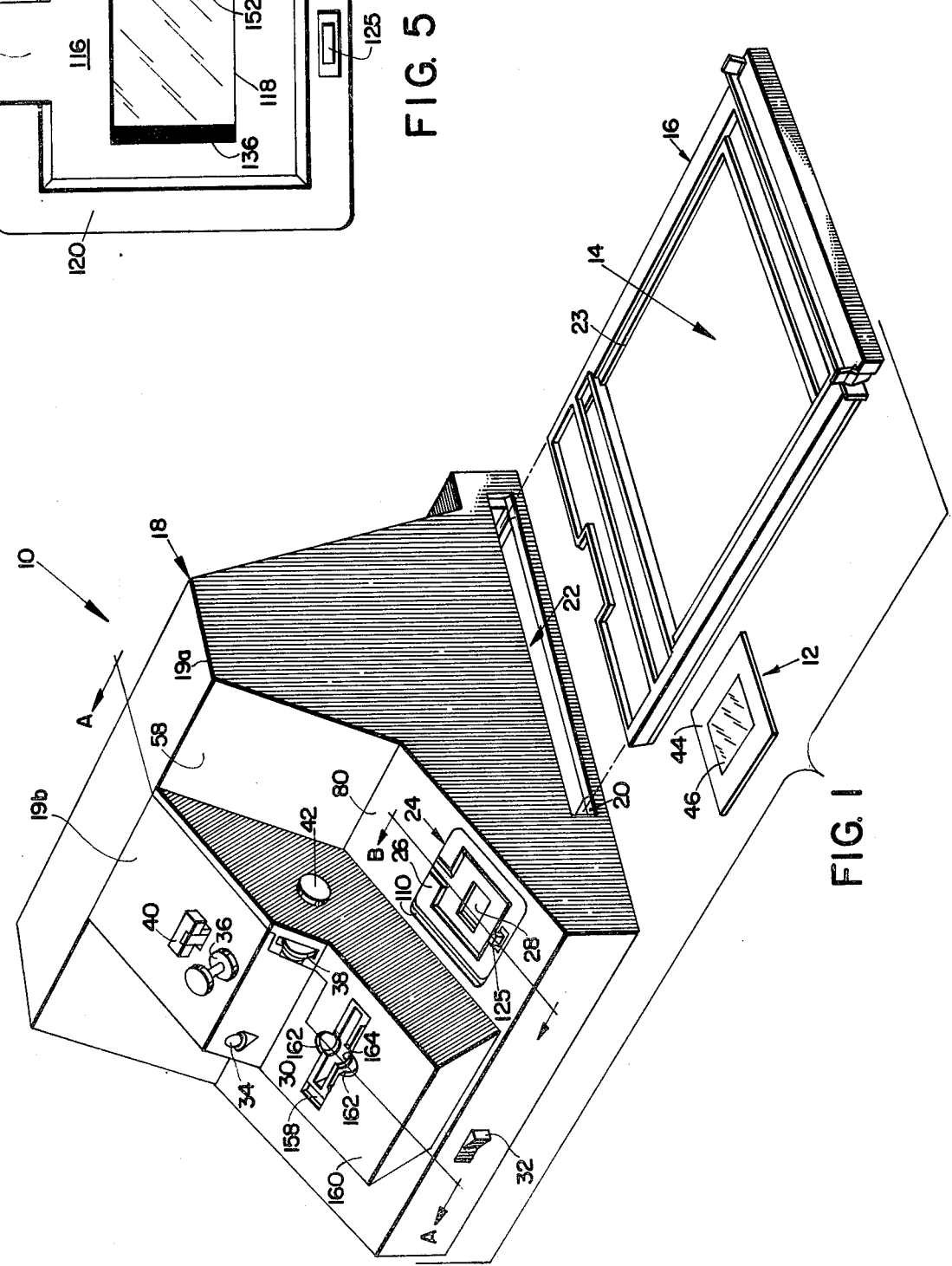
FIG. 1 is a perspective view of the improved photographic copy apparatus embodying the present invention and materials suitable for use therewith including an 8×10 film unit in a cassette and a 35 mm slide transparency.

FIG. 1 of the drawings shows an improved photographic copy apparatus 10 usable with an original picture 12 to be copied, such as a 35 mm slide having a rectangular image area format with a normalized height-to-width ratio (H×W) of 1×1.5, and a photosensitive recording material sheet 14, such as an 8×10 photographic film unit, for previewing the original picture and selecting a portion thereof that is proportional to the normalized format of the film (for example, cropping) and, after previewing and cropping selection, projecting an image of the selected portion onto the recording material for exposure. The improvements which will be described in detail hereinafter relate to structure for automatically locating a picture holder in relation to the image projecting optics in response to manually performing the portion selection function at the viewing station.

In FIG. 1, the original picture or 35 mm slide carries the numerical designation 12. The 8×10 film unit 14 carries a numerical designation 14 and is shown contained in a holding cassette 16.

While apparatus 10 and cassette 16 may be used with any conventional 8×10 film unit, the illustrated cassette 16 is especially configured for use with an image recording negative sheet 14 which forms part of a self-developing color or black and white film unit. Such a film sheet 14 has a coupling leader attached to its forward end and cassette 16 is provided with an elongated access opening 17 through which a mating positive sheet is advanced to interconnect the positive and negative for processing. A self-developing color film unit suitable for use in cassette 10 is disclosed in U.S. Pat. No. 4,009,031. A processing apparatus for effecting the distribution of a fluid processing composition between superposed positive and negative sheets may be found in U.S. Pat. No. 4,019,194 or copending application U.S. Ser. No. 957,294 filed on Nov. 2, 1978 by Loring K. Mills and being assigned to the same assignee as the present application.

Apparatus 10 includes a compact box-like housing 18 having a plurality of angularly disposed walls to assume a compact configuration for enclosing a folded optical path to be described later. In general, housing 18 includes a major housing section 19a for receiving cassette 16; defining an exposure chamber and housing various components associated with previewing the slide. A smaller housing section 19b that sits on the front wall section of 19a primarily houses the projection station and exposure control components.

At the bottom right-hand side end of housing 19a is an elongated horizontal opening 20 through which cassette 16 is inserted into and withdrawn from an internal cassette receiving chamber 22. While it is not shown on the drawings, cassette 16 includes a dark slide covering its exposure aperture 23. Once the cassette 16 is located on its fully inserted position in chamber 22, the dark slide is pulled out for the exposure phase.

Located on the right front side of the lower portion of housing section 19a is a back lighted previewing or viewing station 24 for slide transparency 12; a slidingly movable first picture holder 26 for supporting and properly locating slide 12 at the viewing station 24; and a cropping mask or area selecting frame 28 for visually showing the user that portion of the slide which will be projected by the apparatus optical system. After previewing and cropping selection, the slide 12 is transferred from the first holder 26 to a second slidingly movable holder 30 (coupled to holder 26) which locates it in optical alignment with the projecting system. There are other various control components shown in FIG. 1 including an on/off power switch 32, a ready lamp indicator 34 indicating the state of charge of a strobe flash unit in the projection system, a shutter release cable assembly 36, a lighten/darken exposure control wheel 38, and a contrast adjustment control slider 40. Housing section 19b is adapted to be removed from section 19a and is secured thereto by any suitable means such as the illustrated securing screw 42.

The slide transparency 12 is held in a standard 2″×2″ plastic or cardboard mount 44 and includes the transparent rectangular image area 46 that measures approximately 24 mm×36 mm and has a normalized height-to-width ratio of 1×1.5.

The image area or image frame of the film unit 14 is designated 48 in the drawings and measures approximately 8″×10″. In any event, the normalized height-to-width ratio is 1×1.25. On a normalized basis, it is obvious that the image area 46 of slide 12 is wider than the image area 48 of the film 14. That is, when an enlarged image of the slide area 46 is projected onto film area 48 so that it fills the short leg or height, the projected image will overextend in the width. Therefore, the image of the projected slide must be cropped to fit onto the film format. This may be done by cutting off equal portions on the lateral sides or selecting any desirable portion between the lateral sides having a normalized format of 1×1.25. Later on in the disclosure it will be explained how apparatus 10 is specially configured to make this cropping procedure relatively simple and foolproof.

Figure 2:
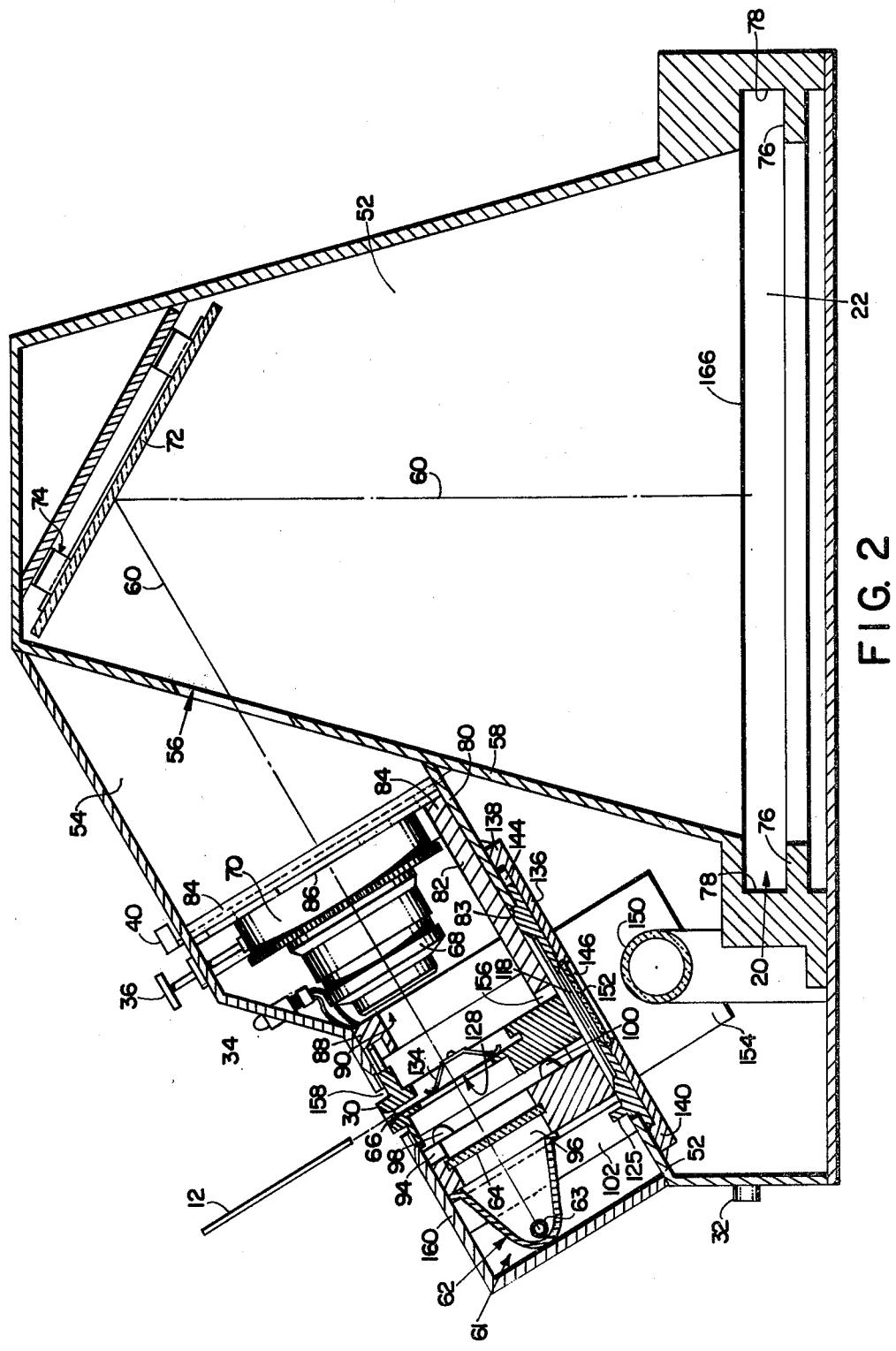
FIG. 2 is an offset cross-sectional view of the apparatus of FIG. 1, partly in section, with a major cross-section being taken along lines A—A and a smaller lower cross-section taken along lines B—B showing the internal construction and arrangement of components therein.

The image projection and exposure control systems of apparatus 10 are best shown in FIGS. 2 and 4 of the drawings. These two particular systems, which will be described herebelow, have been selected for incorporation into apparatus 10 because they are particularly well suited for making photographic copies of an original photographic picture. It is well known in the photographic art that if conventional film is used to make a copy of another photograph using conventional exposure parameters, that the copy will tend to exhibit increased contrast between the H and D characteristics of the original picture and film on which it will be copied tend to multiply. Therefore, copies made from a slide transparency or reflection print are generally made on special copy material having an H and D slope that approaches 1.

However, it has been found that conventional film may be used to make such copies if the exposure is made by a light source, such as a strobe, that provides high intensity illumination for a very short time period. Also, it is now known that the contrast range of the conventional film used to make the copy may be somewhat modified by exposing it to a blended combination of image forming and non-image forming light. Because the special characteristics of the projection and exposure control systems do not form any part of the instant invention, the special characteristics of the system will only be described in limited detail to provide the necessary background to explain the present invention. For a more detailed description of the projection and exposure control systems for controlling contrast in a photographic copy apparatus, reference may be had to a commonly assigned copending application U.S. Ser. No. 914,219 filed on June 9, 1978 (now abandoned and replaced by U.S. Ser. No. 060,491 filed on July 25, 1979) by Thomas A. Svatek which is a continuation in part of his earlier filed application, U.S. Ser. No. 834,685, now abandoned.

To achieve compactness despite the long optical path needed for such enlargement, copy apparatus 10 employs a folded optical path.

As best shown in FIG. 2, housing section 19a primarily defines a major exposure chamber 52 and the cassette receiving chamber 22 therebelow. Exposure chamber 52 communicates with an exposure chamber extension 54 through an aperture 56 in the upper portion of the inclined forward wall 58 of housing section 19a. The exposure chamber extension 54 is located in the forward end of housing section 19b.

As will be described, the image projection system is arranged to define the folded optical path 60 from slide holder 30 to the film 14 located at the apparatus exposure plane in cassette receiving chamber 22. The folded optical path 60 extends from a strobe flash lighting unit 61, having a reflector 62 and a gas-filled flash tube 63, through a light diffuser 64, such as the illustrated opal glass or ground glass screen, and then through the image area 46 of a slide 12 located in a receiving slot 66 of slide holder 30. From slide 12 folded optical path 60 extends through a projection lens 68 having its optical axis on path 60 and exposure control means 70, such as the illustrated conventional shutter and auxiliary contrast control shutter of the type more fully described in the previously noted copending application U.S. Ser. No. 914,219 (now abandoned and replaced by U.S. Ser. No. 060,491). From the shutter assembly 70, optical path 60 extends through the opening 56 in wall 58 to an inclined mirror 72 positioned at the top of chamber 52 at a predetermined angle relative to the projection axis and the exposure plane by a mirror mount 74. Mirror 72 serves to fold optical path 60 and reflect image and optionally blended non-image bearing light provided by the projection system downwardly and in a direction normal to the exposure plane.

The means for locating the copy film 14 in position for exposure include structure defining cassette receiving chamber 22. Included are a pair of horizontally disposed guide rails 76 located at the lateral edges of chamber 22 and a pair of vertically disposed guide surfaces 78 adjacent to rails 76. The cassette 16 is configured to locate film 14 at a predetermined plane therein and the film unit 14 is located at the apparatus exposure plane by the precise location of cassette 16 within chamber 22 by rails 76 and the locating surfaces 78.

The major portion and components of the projection and exposure control systems are located in the rearward portion of apparatus housing section 19b and they will now be described structurally.

The base or support for these systems is provided by an upwardly inclined wall 80 of housing section 19a. Positioned over wall 80 is a parallel overlying mounting plate 82 at the bottom of section 19b and a upstanding mounting plate 84 located at the forward end of plate 82 and mounting the shutter assembly 70 thereon. Mounting plate 84 has a light transmission aperture 86 therein which is concentrically disposed with respect to the first leg of optical path 60 that coincides with the optical axis of lens 68. The projection lens 68 is of the type commonly used to provide high quality enlarged projected images and is fixedly mounted on the back of shutter assembly 70 so that its optical axis lies on optical path 60.

Behind lens 68 is a forward film holder support and guide member 88 having a central light transmission aperture 90 surrounding optical path 60. Mounted at the top rearwardly facing portion a forward film holder support 88 is a double leaf spring 92 which bears against the forward end of holder 30 and provides a biasing force rearwardly thereon to urge it into a rear film holder support and locating structure 94 which has a central aperture 96 that is covered by the on-axis light diffusing plate 64. Support 94 includes a pair of upper low friction hemispherical protrusions 98 and a corresponding similar set 100 at the lower end for providing four low friction support points for the movable first film holder 30 to accurately locate holder 30 relative to lens 68 and guide it smoothly for movement in directions transverse to the axis of lens 68. Positioned behind support structure 94 is a pair of laterally spaced strobe support posts 102 which capture the edge portion 104 of strobe reflector 62 in a slot between posts 102 and the back side of support member 94.

The exposure control system also includes a photocell (not shown) for "looking at" the slide 12 in holder 30 and evaluating the brightness of the back lighted slide image area 46. Output from these photocell readings is fed to an automatic exposure control system for terminating the exposure interval as is well known by those familiar with the photographic art. In the illustrated embodiment, light from the illuminated image area 46 is transmitted through the photocell by means of a prismatic element 106 located off to the right-hand side of lens 68 as best shown in FIG. 4. In the preferred embodiment, prismatic element 106 is multi-faceted and is mounted for rotation on a post 108 just behind the shutter 70 so as to be rotated by the coupled light and dark wheel 38 to present individual faces about its periphery in facing arrangement to the illuminated slide. Each of the faces includes a neutral density filter of a different density value so that by turning wheel 38 the effective sensitivity of the photocell may be altered to provide a print lighten/darken function.

The structure defining the movably mounted and connected first and second picture holders 26 and 30 and the viewing station 24 will now be described.

The viewing station 24 is located on the lower front portion of housing section 19 to the right-hand side of housing section 19b so that it is offset laterally from the axis of lens 68 and the projection optical path 60.

Figure 3:
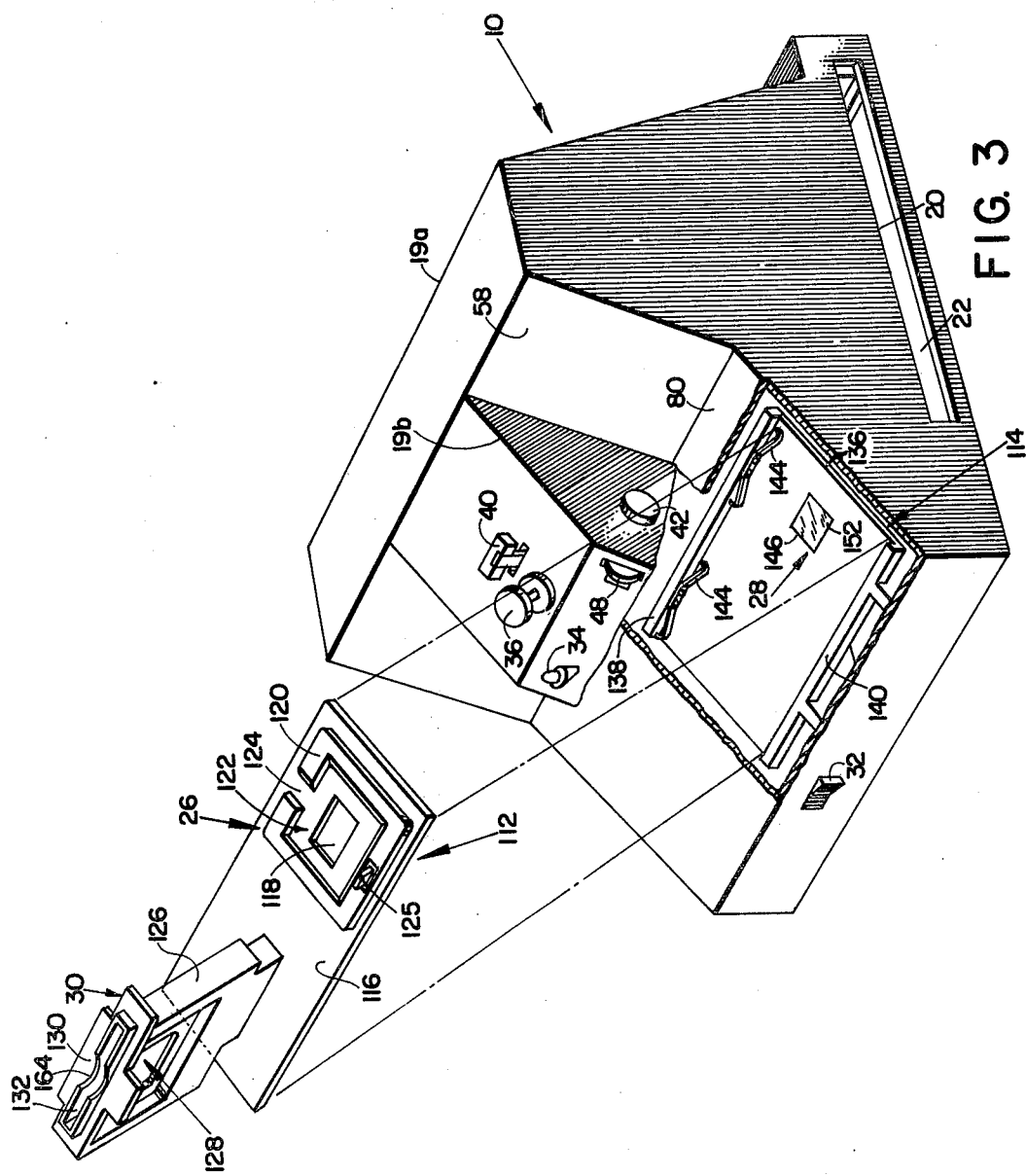
FIG. 3 is a perspective view, partly broken away, showing the details of a cropping and picture holding mechanism as well as a viewing station having a cropping or area selecting mask associated therewith shown in exploded fashion.

With reference to FIG. 1, access to interior components of viewing station 24 is provided by a generally square or rectangular opening 110 in the inclined wall 80 of housing section 19a. As best shown in FIG. 3, the connected first and second picture holders 26 and 30 are utilized in a single movable area selecting or cropping assembly 112 for coordinated simultaneous movement with one another. The second part of the system comprises a fixed cropping assembly mount and area selecting mask assembly 114 secured to housing section 19a below inclined wall 80 and extending from the viewing station 24 to a projection station defined, in part, by the projection picture holder 30.

Assembly 112 comprises a rectangular base plate 116 having a rectangular light transmission aperture 118 near its right-hand end. Aperture 118 has a normalized $1 \times 1.5$ height-to-width ratio and is dimensioned to permit viewing there-through of the entire image area 46 of a 35 mm slide 12 held in a standard $2'' \times 2''$ mount 44. In the illustrated embodiment, aperture 118 measures approximately 24 mm $\times$ 36 mm. Secured to the upper surface of plate 116 around aperture 118 is a slide holding frame 120 that defines a generally square recess 122 about the periphery of aperture 118 for snugly receiving the edges of the $2'' \times 2''$ slide mount 44. Preferably, a cut out section 124 is provided at the top of frame 120 and serves as a finger access opening to facilitate inserting and removing a slide 12. Therefore, the right-hand end of plate 116, aperture 118 and the upstanding frame 120 cooperates to define a second picture holder 26 for holding and supporting an original picture 12 at the apparatus viewing station 24. Also, an upstanding grasping tab or knob 125 is provided at the lower edge of frame 120.

The first or projection picture holder 30 is fixedly secured to the left-hand portion of base plate 116 in laterally spaced relation to the second or viewing picture holder 26. Holder 30 includes a generally rectangular, upstanding block-like member 126 that serves as a base or frame for holder 30 and it includes a centrally disposed light transmission aperture 128 that is sufficiently large to permit light transmission through the entire image area 46 of a slide 12 held in holder 30. Mounted on the top end of the base block 126 is an upper cap section 130 which defines a raised lip slide insert and removal slot 132 that communicates with the slide receiving slot 66 within base block 126 about the periphery of aperture 128. As best shown in FIG. 2, holder 30 includes a pair of double leaf springs 134 disposed at the lateral sides for bearing against side portions of the mount 44 to releasably retain slide 12 in the receiving slot 66.

It will be noted that base plate 116 also serves as a rigid connector coupling together holders 26 and 30 for coordinated simultaneous movement. That is, holder 30 is automatically moved in response to movement of holder 26 and vice versa.

Assembly 114 is adapted to receive assembly 112 in sliding relation thereto and includes a generally rectangular base plate 136 for receiving the base plate 116 of assembly 112 in supportive sliding relation thereto. Upstanding at the longitudinal edges of base plate 136 are a pair of upper and lower rails 138 and 140. The vertical interior surfaces of rails 138 and 140 are spaced apart a distance that is slightly larger than the corresponding dimension of the base plate 116 of assembly 112. The lower rail 140 serves as a reference bearing and guide surface for receiving the lower edge of base plate 116 in sliding relation thereto. The base plate 116 is urged into bearing sliding contact with the lower rail 140 via a pair of double leaf springs 144 secured to the inner edge of top rail 138. Springs 144 engage the upper edge of base plate 116 and provide the biasing force to resiliently urge it into operative relation with the lower rail 140.

Located near the right end of the base plate 136 of assembly 114 is the means for defining a portion selecting frame having a normalized format corresponding to the format of the film 14 and being proportioned in scale to the dimensions of the image area of the original picture 12 so that when the original picture supported in holder 26 and the selecting means are in optical superposition the user may visually determine that portion of the picture within the bounds of the selecting means that will be projected by the projection lens. In the illustrated embodiment, the selecting frame 28 preferably takes the form of those portions of base plate 136 bordering a selecting aperture 146 near the right-hand end of base plate 136. Aperture 146 has a normalized format of 1×1.25 corresponding to the 8×10 format of the film 14 and measures approximately 24 mm×30 mm. Thus it has the same height dimension (24 mm) as the slide holder aperture 118 but it is not as wide. That is, aperture 118 has a width of 36 mm while the selecting frame aperture 146 measures only 30 mm wide. When apertures 118 and 146 are located in superposition, the frame defining portion of base plate 136 surrounding aperture 146 will block a 6 mm portion of the holder aperture 118.

In a preferred embodiment, the viewing station 24 is adapted to back light the slide holder 26 so that a slide 12 is viewed by transmitted light from a viewing station lighting system including an incandescent viewing lamp 148 mounted in housing section 19b in a lamp holder 150 behind aperture 146. In the illustrated embodiment, the selecting frame aperture 146 is covered with a light diffuser 152 such as a translucent oval or ground glass screen.

As best shown in FIG. 2, apparatus 10 is provided with an electrical power supply and control component module or box 154 secured to the underside of fixed base plate 136. Module 154 includes various power supply and exposure control components for operating the various electrical components previously described.

With reference to FIGS. 2 and 3, various openings are provided within the wall structure of housing sections 19a and 19b to accommodate the slide holder and cropping assembly 112 in its sliding relation with assembly 114. The lower component mounting plate 82 in housing section 19b includes an aperture 156 therein providing clearance for holder 30 to assume its illustrated operative position between supports 88 and 94. As shown, when operatively positioned in the projection assembly, the back side of holder base block 126 rests in bearing sliding relation to the referenced sliding protrusions 98 and 100 of support 94. The holder 30 is urged into operative relation with protrusions 98 and 100 by the double leaf spring 92. The upper cap section 130 of holder 30 protrudes through an elongated laterally extending access slot 158 in a top wall 160 of housing section 19b. It will be noted that slots 156 and 158 are dimensioned to extend laterally a sufficient distance to permit the full range of movement of holder 30 transversely of the lens axis that is coincidental with the optical path 60. Optionally, wall section 160 may include a pair of upper and lower finger cut out slots 162 that correspond with aligned finger cut outs 164 and the cap 130 of holder 30 to facilitate finger access to the top edge of a slide 12 for insertion and removal.

As best shown in FIG. 2, the inclined wall section 80 of housing section 19a has an access opening 83 therein through which appropriate portions of assembly 112 extend to locate holder 30 in the projection system and holder 26 in the viewing station 24.

It will be noted that the arrangement of parts provides a very compact and convenient to use structure and that the holders 30 and 26 are arranged so as to be mutually perpendicular. That is, holder 26 holds the slide 12 in a viewing plane that is disposed at approximately a 90° angle to a projection plane wherein holder 30 supports a slide 12 for projection. Thus, the projection plane is transversely disposed with respect to the lens axis while the viewing plane of the slide is substantially parallel to the lens axis. The folded optical path 60 contributes to compactness and the tilt of the viewing station and projection station which locate the viewing and projection planes at non-parallel orientations with respect to the mirror 72 and the exposure plane (designated diagrammatically as line 166 in FIG. 2) also contributes significantly to compactness.

The improved photographic copy apparatus 10, embodying the present invention, operates as follows.

The cassette 16 is loaded with a photosensitive film unit 14. The cassette is inserted into receiving chamber 22 and the dark slide (not shown) is withdrawn to uncover the exposure aperture 23. In this manner, the film unit 14 is located in position for exposure at exposure plane 166.

Figure 5:
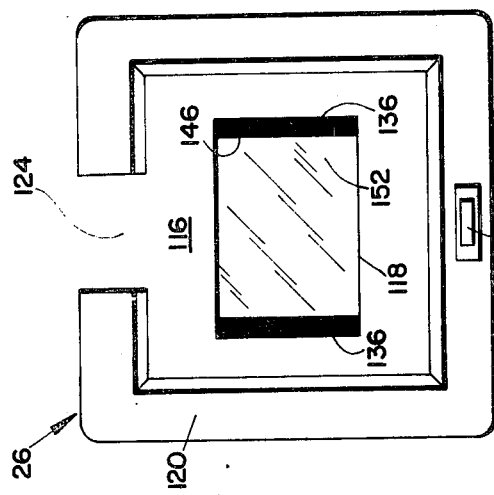
FIG. 5 is a diagrammatic plan view showing a 35 mm slide held in a viewing station picture holder to locate its image area in superposed optical alignment with the cropping mask and a viewing station light source therebehind.

The user then turns on power switch 32 to activate the electrical system including the viewing station light bulb 148. A slide 12 to be copied is placed in the first picture holder 26 in viewing station 24 where the selected portion is illuminated by light passing through the smaller selection frame aperture 146. The part that will be cropped by the apparatus optical system appears to be black in that the mask structure blocks transmission of the viewing light in those portions of the slide image area 46 that does not overlie the selecting frame aperture 146. By grasping the frame knob 125 the user may then slide the entire assembly 112, including the first and second picture holders 30 and 26 selectively to the left or right thereby moving the slide 12, holder 26, and holder 30 simultaneously in a direction transverse to the lens axis. The user may choose to center the image area 46 over the selecting frame aperture 146 thereby showing the selected 1×1.25 portion as an illuminated rectangle in the center of image area 46 while the remaining portions of area 46 that will be cropped by the apparatus optical system appear as black lateral borders. Such a cropping selection is diagrammatically shown in FIG. 5 of the drawings. The user alternatively may move assembly 112 to the left or the right thereby moving the slide image area 46 over the selecting aperture 146 to vary the position of the illuminated portion while simultaneously causing the projection film holder 30 to be moved a corresponding distance transversely to the lens axis to a corresponding selected projection position so that the projected image portion automatically corresponds to the illuminated selected portion at the viewing station 24. Having selected the portion to be copied visually and thereby having automatically set holder 30 to the correct corresponding selected projection position, the user then transfers the slide 12 from the viewing and cropping picture holder 26 to the projection picture holder 30. By this time the indicator lamp 34 should be illuminated indicating that the strobe unit capacitor (not shown) housed in electronic module 154 is fully charged. To expose the film unit 14 at the exposure plane, the user merely pushes down on the cable release 36 to actuate the shutter 70 and its associated automatic exposure control system including the photocell. Following exposure, the dark slide of cassette 16 is pushed in over the exposure aperture 23 and cassette 16 is removed from its receiving chamber 22. The film unit 14 is then developed and a positive print is made therefrom. In the event that film unit 14 forms part of a self-developing film unit of the type previously described, the operator may have his positive print in a matter of a few minutes. Should he wish to make adjustment in contrast and brightness in the next copy, the exposure system may be modifed by operation of the previously described lighten/darken wheel 38 and/or the contrast control device 40. Device 40 controls contrast by adjusting the ratio of image bearing and non-image bearing light transmitted through the system to the exposure plane. A more detailed explanation of this contrast control system may be found in the previously noted copending application U.S. Ser. No. 914,219 (now abandoned and replaced by U.S. Ser. No. 060,491).

In the illustrated embodiment, the selection mask 28 was fixed and the slide 12 in the holder 25 was moved relative thereto to effect simultaneous coordinated movement of the projection holder 30. Those skilled in the art will appreciate that apparatus 10 may be modified in an obvious manner so that the slide 12 is held in a fixed holder at the projection station 24, the mask 28 may be made movable relative to the fixed holder and also be coupled directly to holder 30 so that the position of holder 30 is automatically determined in response to moving the selection mask over the fixed slide position. Those skilled in the art will appreciate while the illustrated embodiment deals with making copies from slide transparencies that apparatus 10 and the associated viewing station and cropping guide system may be suitably modified to make copies of original reflection print pictures 12. Also while the selecting frame 26 is shown to be located between the slide in holder 26 and the viewing station light source apparatus 10 may be modified within the intended scope of the invention so that these three elements having a different sequential order including positioning the selecting frame in front of the original picture toward the user.

It will be appreciated that this invention may be embodied or practiced in still other ways without departing from the scope or essential character thereof. Therefore, the embodiments described herein are illustrative and not restrictive, the scope of the inventions being indicated by the following claims, and all inventions which come within the meaning of these claims are intended to be embraced therein.

What is claimed is:

1. An improved photographic copy apparatus, usable with an original picture to be copied and photosensitive imaging recording material that each have respective different first and second normalized image area formats, for previewing the original picture and selecting a portion thereof that is proportional to said first format of the recording material and thereafter projecting an image of the selected portion onto the recording material for exposure, said copy apparatus being of the type including means for locating image recording material of said first format in position for exposure, projecting means, including a lens having an optic axis, for projecting an image of the selected portion of the original picture of said second format onto the image recording material at said exposure position for exposure, means for controlling the exposure, a first picture holder for supporting the original picture in optical alignment with the lens axis, and a previewing station including a second picture holder for supporting an original picture for viewing and selection of the portion to be copied wherein the improvement comprises:

means for mounting said first picture holder for movement transversely relatively to said lens axis so that said first picture holder may be located at a selected projection position wherein the selected portion of an original picture supported in said first picture holder is in optical alignment with said lens axis for image projection onto the image recording material at said exposure position;

means, cooperatively associated with said previewing station and said second picture holder thereat, for defining a portion selecting frame having a normalized format corresponding to said first format of said recording material and being proportioned in scale to the image area dimensions of the original picture so that when an original picture supported in said second holder, and said selecting frame are in optical superposition, the user may visually determine that portion of the picture within the bounds of said selecting frame that will be projected by said lens;

means for mounting one of said second picture holder and said selecting frame for movement relative to the other so that said selecting frame may be located with respect to any selected portion of the entire image area of a picture supported in said second picture holder; and means for coupling said movably mounted one of said second picture holder and said selecting frame to said first picture holder such that said first picture holder is automatically moved, in response to movement of said movably mounted one of said second picture holder and said frame, to a corresponding selected projection position wherein it will locate for image projection the same selected portion of the original picture bounded by said selecting frame after the original picture is transferred from said second picture holder to said first picture holder.

2. The improved copy apparatus of claim 1 wherein said selecting frame is fixedly positioned on said apparatus, said second picture holder is mounted for movement with respect to said fixed selecting frame and said coupling means couples said first and second picture frames together for coordinated movement.

3. The improved copy apparatus of claim 1 wherein said coupling means includes a rigid connector coupled to both said first and second picture holders such that they are connected together for simultaneous coordinated movement.

4. The improved copy apparatus of claim 1 wherein the original picture is a transparency adapted to be viewed by transmitted viewing light, said viewing station includes means for providing a source of transmitted viewing light directed towards the image area of a transparency supported in said second picture holder and said selecting frame includes means for defining a selecting frame aperture of said first normalized format, said frame defining means being located between said viewing light source and said transparency so that viewing light transmitted through said transparency is limited to an area corresponding to said selected portion.

5. The improved copy apparatus of claim 1 wherein said first picture holder is configured to support an original picture at a projection plane, said second picture holder is configured to support an original picture at a viewing plane and said first and second picture holders are mounted on said apparatus such that said viewing and projection planes are substantially perpendicular to one another.

6. The improved copy apparatus of claim 5 wherein said means for locating the image recording material in position for exposure locates it at an exposure plane, said projecting means includes optical means for defining a folded optical path from said lens to said exposure plane and said first and second picture holders are orientated with respect to said exposure position so that said viewing and projecting planes are disposed in non-parallel orientations with respect to said exposure plane.

* * * * *